United States Patent [19]
Harish et al.

[11] Patent Number: 5,940,850
[45] Date of Patent: Aug. 17, 1999

[54] SYSTEM AND METHOD FOR SELECTIVELY ENABLING LOAD-ON-WRITE OF DYNAMIC ROM DATA TO RAM

[75] Inventors: Grama Kasturi Harish, Cedar Park; James Darrell Heath; Vishwanath Venkataramappa, both of Austin, all of Tex.

[73] Assignee: International Business Machines Corporation, Armonk, N.Y.

[21] Appl. No.: 08/742,108

[22] Filed: Oct. 31, 1996

[51] Int. Cl.[6] .............................. G06F 12/10; G06F 13/00
[52] U.S. Cl. ............................ 711/102; 711/206; 395/652
[58] Field of Search ..................... 711/206, 207, 711/208, 209, 102, 103, 104, 170, 202, 203; 395/651, 652

[56] References Cited

U.S. PATENT DOCUMENTS

| | | | |
|---|---|---|---|
| 5,193,170 | 3/1993 | Lam | 711/165 |
| 5,367,658 | 11/1994 | Spear et al. | 711/163 |
| 5,437,018 | 7/1995 | Kobayashi et al. | 395/652 |
| 5,594,903 | 1/1997 | Bunnell et al. | 395/712 |
| 5,696,927 | 12/1997 | MacDonald et al. | 711/207 |
| 5,699,539 | 12/1997 | Garber et al. | 711/202 |
| 5,802,549 | 9/1998 | Goyal et al. | 711/165 |

*Primary Examiner*—Glenn Gossage
*Attorney, Agent, or Firm*—Robert M. Carwell; Mark S. Walker

[57] ABSTRACT

A system and method for loading dynamic data stored in read-only memory (ROM) is loaded into random access memory (RAM) only when it is being modified. Unmodified dynamic data is used from ROM saving valuable RAM space. Virtual memory page table entries are created for all dynamic data with the physical reference pointing to the dynamic data in ROM. Page table entries in a translation table for dynamic data in ROM include a virtual address to physical address mapping and are marked read-only causing a write-access exception if an attempt is made to write to or update the dynamic data. Write-access exceptions are intercepted, and a write-access exception caused by an attempt to write to dynamic data in ROM causes the system to allocate a dynamic data page in RAM, copy the ROM data to the RAM, update the page table entry to point to the RAM page rather than the ROM page, and finally to update the dynamic data now present in read-write RAM.

10 Claims, 3 Drawing Sheets

SYSTEM AND METHOD FOR SELECTIVELY ENABLING LOAD-ON-WRITE OF DYNAMIC ROM DATA TO RAM

BACKGROUND OF THE INVENTION

1. Field of the Invention

The present invention relates to computer system operations and, and, in particular, to the operation of a computer system executing programs embedded in a read-only device such as a computer read only memory (ROM) device. More particularly, the present invention relates to the operation of an embedded computer system having a ROM device and a random access memory (RAM) device to minimize the size of the RAM device by delaying the loading of dynamic data from the ROM device to the RAM device until modification of that data is required.

2. Background and Related Art

The present invention is directed to an improved method and apparatus for use with embedded computer systems. Embedded computer systems include a processor for performing instructions and input and output interfaces to collect data and transmit control signals. The instructions to be performed are typically stored on a read-only memory ROM device. Embedded computer systems are used, for example, to control automobile engine function and to provide a variety of other "intelligent devices."

Manufacturers using embedded computer systems are very conscious of the cost of each component of those systems. Small cost savings in embedded systems used in mass produced items such as automobiles are very important when considered over the production volume of the item. The size of ROM and the size of random access memory (RAM) provided for an embedded system directly affect cost. ROM is less expensive than RAM and has the advantage of retaining data even when powered off (ROM provides non-volatile storage). Manufacturers therefore benefit by storing the as much of the program and data code in a ROM device as possible and by supplying a RAM device of minimal size.

ROM images are therefore used to contain the basic operating programs for an embedded device. A minimum amount of RAM is provided to store data readings and other changeable information. Dynamic or changeable data must reside in the random access device. Existing embedded systems require sufficient RAM to load all dynamic data into RAM when the tasks are initialized. A particular piece of dynamic data may or may not be changed during a particular execution sequence. Thus, loading of all dynamic data into RAM consumes more RAM than is needed to contain the data actually modified during an execution sequence.

U.S. Pat. No. 5,437,018 entitled "Emulation of Semiconductor and Magnetic Auxiliary Storage Devices with Semiconductor Memory" discusses a prior art system than includes copying of modifiable ROM areas to RAM on system initialization.

Read-only data is often mapped to RAM in computer systems. U.S. Pat. No. 5,367,658 entitled "Interrupt Management Method" discusses the mapping of ROM data into RAM memory and the use thereof. U.S. Pat. No. 5,193,170 entitled "Methods and Apparatus for Maintaining Cache Integrity Whenever a CPU Write to ROM Operation is Performed with ROM Mapped to RAM" is directed to a cache management system that detects CPU write to ROM mapped to RAM and invalidates CPU cache data associated with the mapped ROM data. This patent discloses full mapping of ROM into RAM.

The prior art does not provide any way to load only selected dynamic data from ROM to RAM so that RAM requirements are minimized. Thus, a technical problem exists of finding a way to load into RAM only the dynamic data that will be changed during execution. Solution of this problem will reduce the size of the RAM required thereby reducing the cost of manufactured embedded systems.

SUMMARY OF THE INVENTION

ROM data is loaded into random access memory (RAM) only when that data is actually being modified. An attempt is detected to write to dynamic data in ROM and generates a write-access fault. The write-access fault is captured causing the system to copy the ROM data to RAM, change a page table entry to point to the RAM copy, and then write the data. This mechanism avoids loading ROM data that is not modified thereby reducing the RAM requirements for a given system.

The present invention is directed to a computer implemented method for loading read-only memory data into random access memory only when the data is modified, in a computer system having a processor, random access memory and read-only memory, comprising the steps of: storing a data page table entry for translating a virtual data address into physical data address for each dynamic data page; storing in the page table an indicator that-the page table entry is read-only if the physical data address is in read-only memory; receiving a write-access exception whenever the computer system attempts to write to a dynamic data page having a read-only indicator, and loading the read-only memory dynamic data page into random access memory in response to the write-access exception. The page table entry for the data page is then updated for future access by the system.

It is therefore an object of the present invention to provide an apparatus and method for loading dynamic data from ROM to RAM only when that data is to be modified.

It is yet another object of the invention to provide an apparatus and method for using ROM dynamic data for execution unless that data is modified.

It is yet another object of the invention to provide an apparatus and method for enabling use of dynamic data in ROM without modifying the application program or base operating system function.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

The present invention operates in conjunction with a computer system having a processor and memory. The preferred embodiment is directed to an embedded microprocessor based computer system, such as one used to control "intelligent devices" or provide functions such as an intelligent "set-top box" for decoding cable signals or Internet traffic.

Figure 1:
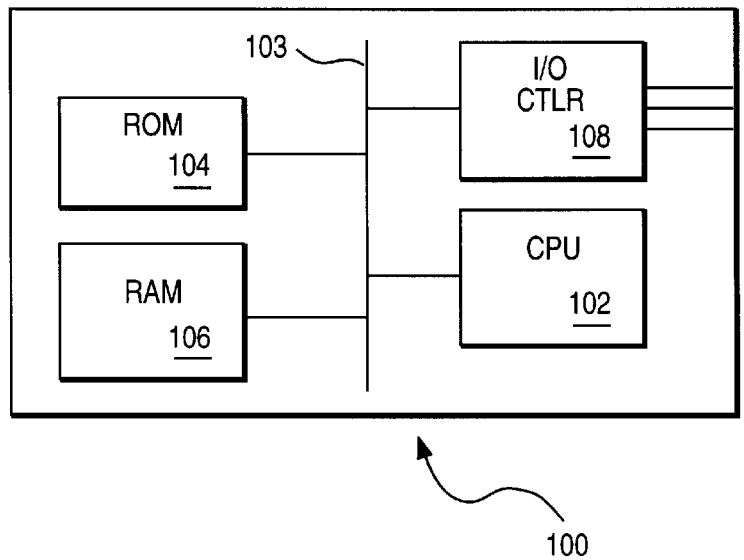
FIG. 1 is an embedded block diagram of a computer system embodying the preferred embodiment of the present invention.

An embedded computer system, in a simple form, is illustrated in FIG. 1. The overall system 100 includes a central processing unit (CPU or processor) 102, for performing the necessary data collection, calculation and control activities. Processor 102 can be any one of several known microprocessors that support virtual memory and memory pages. The preferred embodiment uses an IBM PowerPC microprocessor (PowerPC is a trademark of the International Business Machines Corp. Armonk N.Y.) The processor is connected by system bus 103 to a read-only memory device (ROM) 104, a random access memory (RAM) 106 and to input/output (I/O) controller 108. Input/Output controller 108 manages the interface of the embedded device to the outside world. The input/output (I/O) controller may be connected to devices providing input to the controller, for example, digital or analog signals from instruments, it may be connected to control signal outputs (digital or analog) and it may provide an output display, such as a light emitting diode (LED) display, screen display or similar device. Hardcopy output devices and diagnostic, debugging or programming devices may also be attached to the embedded system.

The ROM memory may be of any known type. The preferred embodiment employs a ROM memory manufactured by the Advanced Microdevices (AMD) or Intel Corp. capable of holding 512Kx8 (4 Megabytes) or 128Kx8 (1M Megabytes) bytes of information. The preferred embodiment includes RAM with a capacity of 4 Megabytes.

The ROM image must include all of the instructions and data necessary to operate the embedded device. The image includes an operating system portion that controls the overall operation of the system and an application portion that directs the specific application of the embedded system. For example, an embedded automobile engine control system will have an engine control application embedded in the ROM Image.

The operating system and application make use of two types of data: constant static data and dynamic data. Constant data is data that is not changed by the application or operating system. Constant data may include items such as message text or constant values for calculations (e.g. the fuel tank capacity). Dynamic data is data that may be changed by the application. This could includes items such as the current speed of the vehicle, current miles per gallon calculated, or current setting of the fuel mixture. Dynamic data may include data fields that vary only if a certain application path is chosen by the application or user. Thus, if calculation and display of miles per gallon is a user selectable option, that dynamic data value would be changed only when that option is selected.

Figure 2:
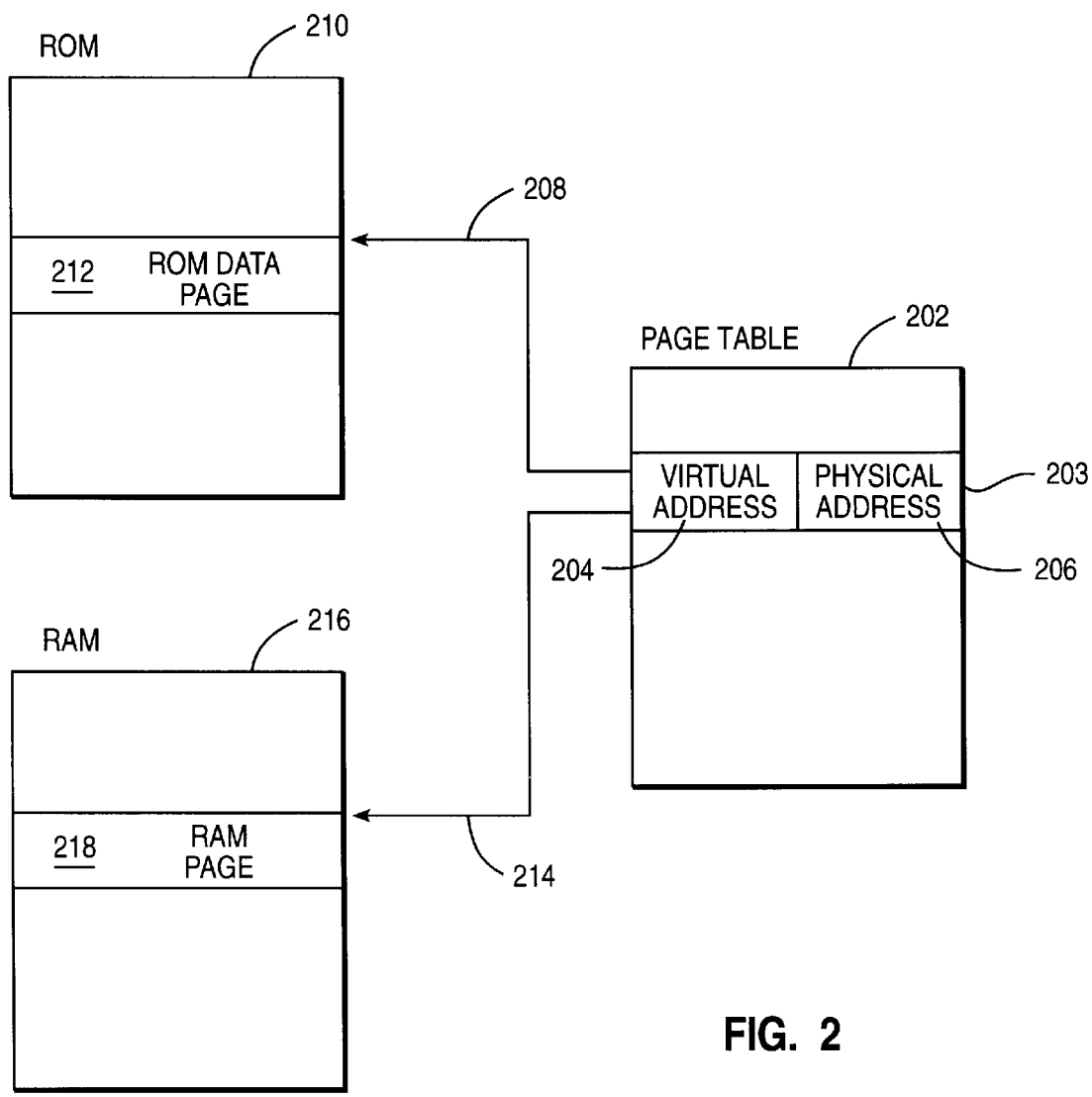
FIG. 2 is a block diagram of page table entries according to the preferred embodiment of the present invention.

Virtual memory management systems separate the logical system memory reference from the physical address of the referenced object. This allows the system to reference a greater amount of memory than is physically present in a system. Virtual memory management schemes typically are based on pages of memory. At any point in time a number of pages are present in memory. These pages are tracked using a page table that cross references the virtual address to the location of the actual page containing the memory data. If an address reference is requested that does not exist in the page table, a page fault occurs requiring the referenced page to be loaded into memory. Memory pages are typically managed on a least recently used basis. The system will discard the least recently used page in memory and replace it with the one requested. If necessary, the page to be discarded is written out to storage before the page is freed The translation of a virtual address to the physical address is performed using a page table with a page table entry for each page in memory. FIG. 2 illustrates such a table 202. The page table entry 203 for a page containing dynamic data includes a virtual address 204 and a physical address 206. A page table can reference physical addresses in ROM 210 or RAM 216. In the preferred embodiment, the page table entry for a page containing ROM dynamic data is created with the physical address 206 pointing 208 to the ROM data page 212 containing the data. The protection for page table entry 203 is set to "read-only" even though it references dynamic data. This protection setting will cause the operating system to raise a "write-access" exception if an attempt is made to write to the data area.

Figure 3:
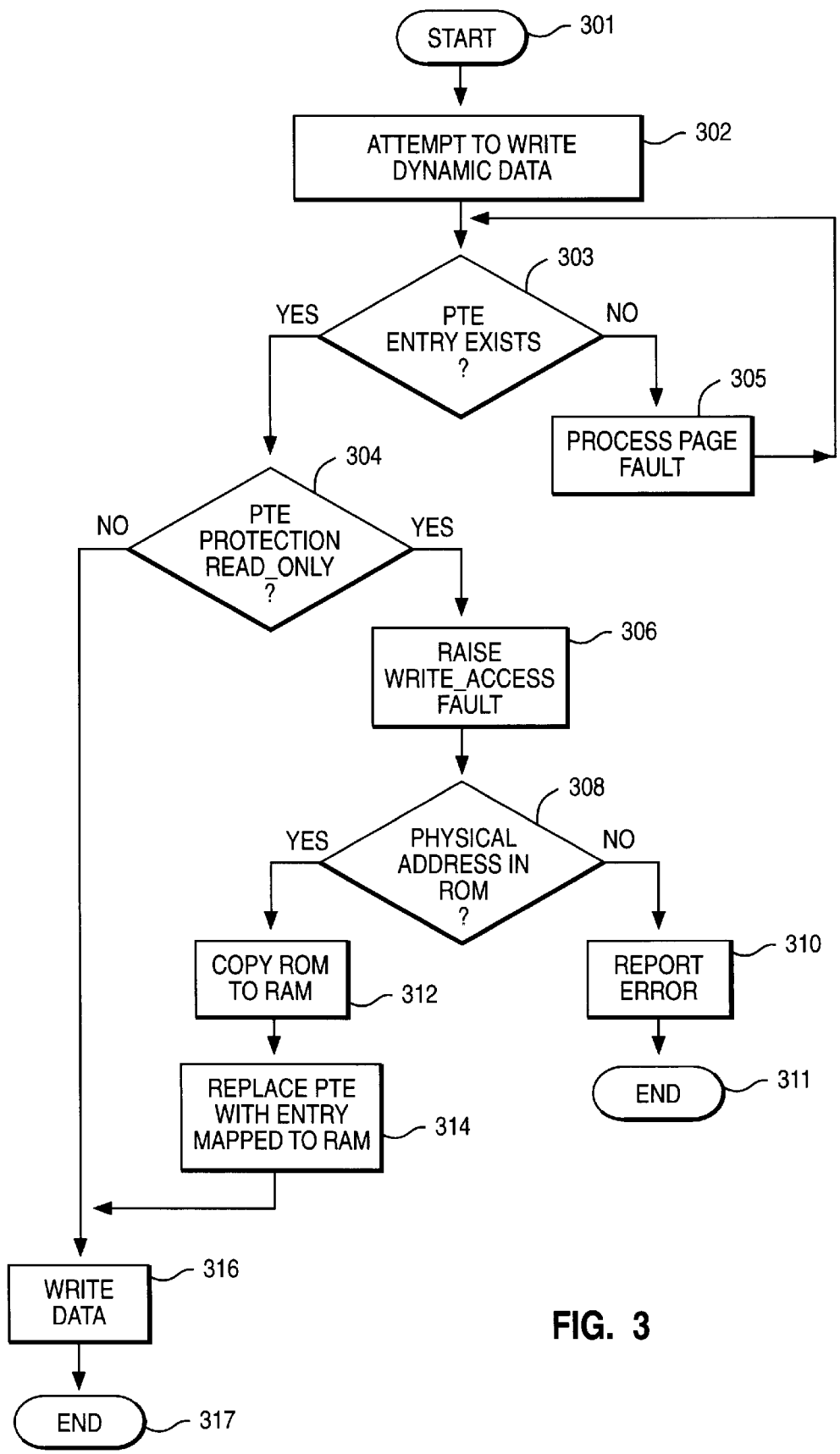
FIG. 3 is a flowchart depicting the process of loading dynamic data into memory upon write access.

The present invention adds logic to the routine for handling write-access exceptions or faults. The flowchart of FIG. 3 illustrates the process flow for handling write-access faults for dynamic data resident in ROM. The process begins at the start block 301. The system then raises a write-access fault at step 306 when an attempt is made to modify a piece of dynamic data at step 302. After an attempt to write dynamic data is made at step 302, a query is made of whether a page table entry (PTE) exists at block 303. If yes, the process continues to step 304 to be hereinafter described. If no PTE entry exists, flow exits to the right of block 303, indicating a process page fault at block 305 and the process returns to block 303. The system tests in step 304 to determine whether the page table entry PTE protection is "read-only". If not, the data is written at step 316 using known processes. If the entry is "read-only" a "write-access fault" is raised at step 306.

The system described herein intercepts the write-access fault and tests whether the physical address references dynamic data in ROM at step 308. If not, the write attempts was an error indicating a static data page and an error exception is raised at step 310, whereupon the process ends at step 311. If the physical address is in ROM, the system of the present invention creates a page in RAM and copies the ROM page to the RAM page at step 312. The page table entry 203 (FIG. 2) is modified so that the physical address 206 references the RAM page 218. This is shown at step 314 wherein the page table entry 314 is replaced with an entry mapped to RAM. The new physical reference is used to write the modified data at step 316.

The preferred embodiment of the invention operates in a microkernel operating environment. The invention is not limited to such an environment and can operate in any system with virtual memory management. The preferred embodiment creates the dynamic data references by the process illustrated in FIG. 4.

The operating system initializes a virtual memory manager. The virtual memory manager creates a VMAP containing objects representing the data region of the system. The VMAP entries are remapped into the address space of each of the created tasks. The VMAP entries are marked as read-only for constant data and read-write for dynamic data.

Figure 4:
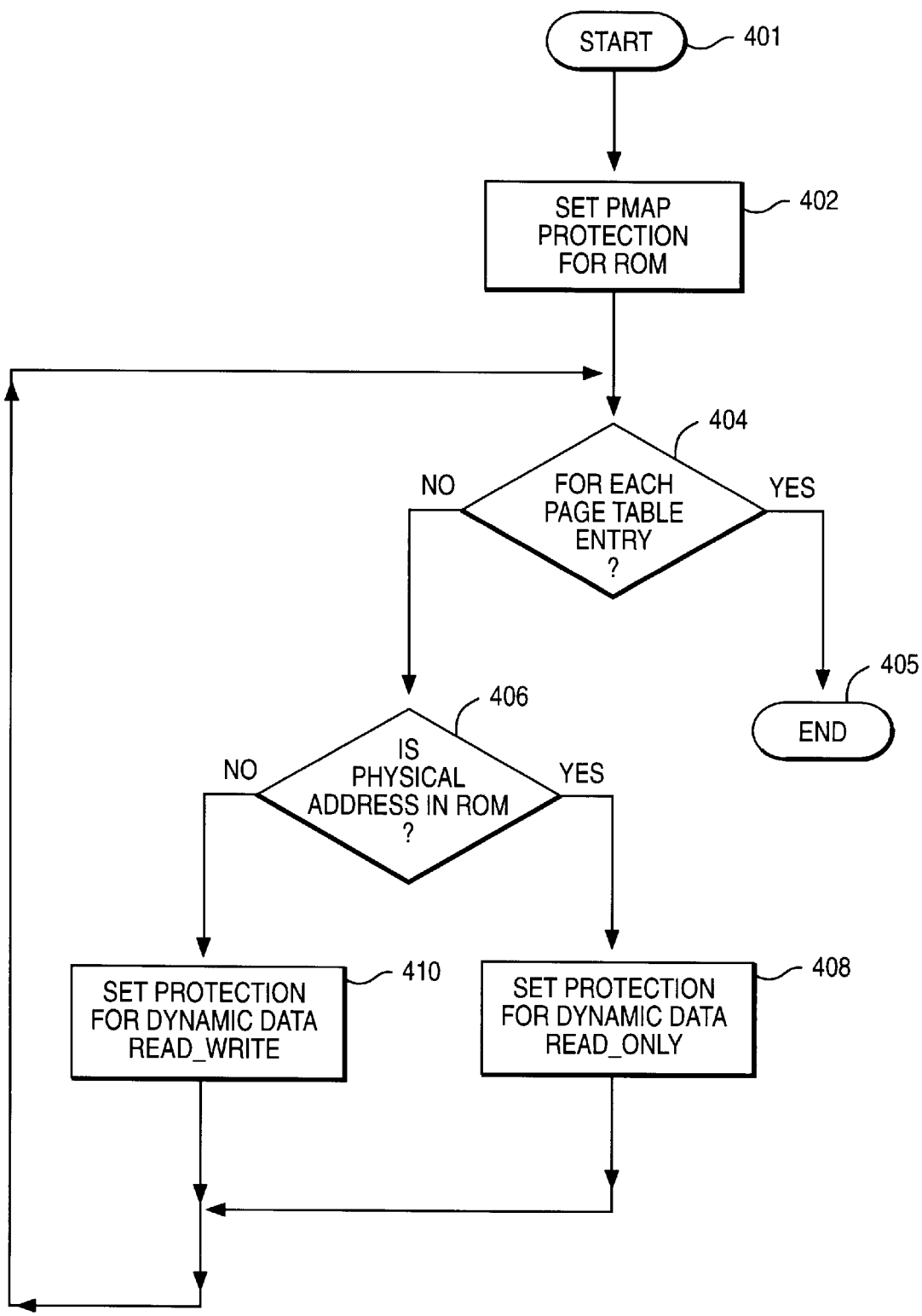
FIG. 4 is a flowchart depicting the process of setting up the page table entries according to the present invention.

The preferred embodiment creates page table entries using the process illustrated in FIG. 4 starting at step 401. First the PMAP protection is set for the ROM at step 402. Next, a query is made of whether the protection has been set for each page table entry at block 404. If yes, the process ends at block 405. If not, flow continues to block 406 to be hereinafter described. The physical memory map (PMAP) is created with page table entries (PTE) for each page of data and program loaded into memory. In addition, a page table entry is created for each page of ROM that will be used in the execution of the program. These pages include code pages and pages containing dynamic data. Each page table entry contains a protection indicator of whether that page is read-only or read-write accessible. Each page table entry is tested to determine whether the physical address is in ROM in step 406. If so, the protection for dynamic data is set to read-only 408. Otherwise, the protection is set to read-write in step in step 410. The page table entry read-only protection causes a write-access fault when an attempt is made to update the data on the referenced page. This marking and fault generation enables the present "load on write" technique to access and load dynamic data from ROM only when that data is needed.

It will be understood from the foregoing description that various modifications and changes may be made in the preferred embodiment of the present invention without departing from its true spirit It is intended that this description is for purposes of illustration only and should not be construed in a limiting sense. The scope of this invention should be limited only by the language of the following claims.

We claim:

1. A computer implemented method for loading read-only memory data into random access memory only when the data is modified, in a computer system having a processor, the random access memory and read-only memory, comprising the steps of:

storing an indicator that a data page having a physical address is read-only if said physical address is in read-only memory;

receiving a write-access exception whenever the computer system attempts to write to a data page having a read-only indicator; and loading said data page having said read-only indicator into the random access memory in response to said write-access exception.

2. The method of claim 1, further comprising the steps of:

storing said indicator and a virtual data address to physical address mapping in a page table entry for said data page having said read-only indicator executing modifications of the page table entry physical address to the physical address of a random access memory location of the data; and writing said modifications to the random access memory location.

3. The method of claim 1, further comprising the steps of:

storing an indicator that said data page having said read-only indicator is a dynamic data page if it contains dynamic data, otherwise storing an indicator that said data page is a static data page;

testing said write access exception to determine whether said write access exception is to a static data page; and returning an error if said write access exception is to a static data page.

4. A system for loading read-only memory data into random access memory only when the data is modified, in a computer having processor means and storage means, the system comprising:

means for storing a virtual address to physical address translation table having at least one virtual address and a corresponding said physical address means for marking entries in said translation table as read only if a corresponding said physical address was in read only memory;

means for generating an exception if said processor means accesses for writing an address in said read only memory;

means for copying the read only memory data to a random access memory location in response to said exception.

5. The system of claim 4, further comprising:

means for updating said translation table by replacing said corresponding physical address with an address of the random access memory location.

6. The system of claim 4, further comprising:

means for identifying physical data areas as containing static data;

means for generating an error message if the exception is for a data area containing static data;

and wherein said means for creating a random access memory location does so only when said exception is not for a static data area.

7. The system of claim 6, wherein said means for identifying is a physical memory map.

8. A computer program product for use in a computer system having a processor means, said program product having a computer readable medium having computer program instructions recorded thereon for loading read-only memory data into random access memory only when the data is modified, said computer program product comprising:

computer program product means having computer readable means for storing a virtual address to physical address translation table having at least one virtual address and a corresponding said physical address computer program product means having computer readable means for marking entries in said translation table as read only if a corresponding said physical address was in read only memory;

computer program product means having computer readable means for generating an exception if said processor means accesses for writing an address in said read only memory;

computer program product means having computer readable means for creating a random access memory location and copying the read only memory data to said location in response to said exception.

9. The program product of claim 8, further comprising:

computer program product means having computer readable means for modifying said translation table by replacing said corresponding physical address with an address of the random access memory location.

10. The program product of claim 8, further comprising:

computer program product means having computer readable means for detecting a write access to static data and generating an error message instead of allocating a random access memory location for the static data.

* * * * *

UNITED STATES PATENT AND TRADEMARK OFFICE
CERTIFICATE OF CORRECTION

PATENT NO : 5,940,850
DATED : August 17, 1999
INVENTOR(S): Harish, et al.

It is certified that error appears in the above-identified patent and that said Letters Patent are hereby corrected as shown below:

Column 2, line 14 please delete "system to copy" and substitute therefor --copying of--;
Column 5, line 13, please delete the second occurance of "in step".

Signed and Sealed this

Seventeenth Day of April, 2001

Attest:

NICHOLAS P. GODICI

*Attesting Officer*   *Acting Director of the United States Patent and Trademark Office*